United States Patent [19]

Simms et al.

[11] Patent Number: 5,349,504

[45] Date of Patent: Sep. 20, 1994

[54] MULTI-LEVEL LIGHTPIPE DESIGN FOR SMD LEDS

[75] Inventors: Norman Simms, Barnegat; Michael Cazzola, Toms River, both of N.J.

[73] Assignee: Dialight Corporation, Manasquan, N.J.

[21] Appl. No.: 89,775

[22] Filed: Jul. 12, 1993

[51] Int. Cl.[5] .............................................. F21V 7/04
[52] U.S. Cl. .................................... 362/32; 362/800; 362/249
[58] Field of Search ............... 362/32, 800, 27, 31, 362/252, 249

[56] References Cited

U.S. PATENT DOCUMENTS

| Re. 34,254 | 5/1993 | Dragoon | 362/800 |
| 4,897,769 | 1/1990 | Lang | 362/800 |
| 5,268,823 | 12/1993 | Yergenson | 362/32 |

*Primary Examiner*—James C. Yeung
*Assistant Examiner*—Sara Sachie Raab

*Attorney, Agent, or Firm*—Oblon, Spivak, McClelland, Maier & Neustadt

[57] ABSTRACT

A multi-level lightpipe and housing are utilized a surface mount LEDs. The multi-level lightpipe is in the form of a single molded part which can collect light from multiple LEDs and redirect light to different locations. The lightpipe includes two or more separate passageways for separately redirecting and transmitting light from two or more separate light sources, such as two or more separate LEDs. The housing has an opening for receiving the multi-level lightpipe therein. The housing also includes an attachment mechanism for permitting the housing with the lightpipe positioned therein to be removably attached to a printed circuit board such that light from a first LED is directed and transmitted through one of the separate passageways, and light from a second LED is directed and transmitted through another of the separate passageways of the multi-level lightpipe.

11 Claims, 7 Drawing Sheets

MULTI-LEVEL LIGHTPIPE DESIGN FOR SMD LEDS

BACKGROUND OF THE INVENTION

1. Field of the Invention

The present invention relates to structures for mounting visual indicators on a printed circuit board in an X by Y direction wherein X is the width of the structure and Y is the height of the structure. The present invention also relates to a multi-level lightpipe design in which a multi-tiered optical waveguide is snapped onto a printed circuit board so as to redirect light from a set of surface mounted light emitting diodes which have been initially reflowed and electrically contacted to a printed circuit board.

2. Discussion of the Related Art

Right angle circuit board indicators have been utilized in the form of different sizes since around 1970. To handle needs for increased packaging density and simplified assembly labor, through-hole circuit board indicators designed and built into arrays have been conventionally used. These arrays can either be horizontally grouped, vertically grouped or both.

The transition from through-hole soldering processes to surface mount processes has created the need for surface mount compatible circuit board indicators that are also right angle devices. However, the conventional approaches for increased packaging densities for through-hole indicators are less satisfactory for surface mount applications. A surface mounted LED should ideally be visible and accessible around the solder connections so that solder joint integrity is viewable and so that rework is possible. A limitation exists in package height because common component placement equipment in use can only clear components at relatively low heights from printed circuit board surfaces. Further, stability of taller surface mount devices may be a problem. Finally, the weight of an array may be greater than component placement equipment can readily accommodate.

The use of lightpipes to redirect light as well as the use of right angle circuit board indicators are known. The use of multiple LEDs to illuminate a translucent plastic part in order to provide uniform backlighting as well as the use of individual fibers to transmit multiple light sources are also well known. However, the use of a multi-level lightpipe as set forth in the present invention, which can collect light from multiple LEDs and which can redirect the light to different locations without a mixture of the light between the LEDs, has not yet been realized.

OBJECTS OF THE INVENTION

Accordingly, an object of the present invention is to provide a novel molded lightpipe to be used with surface mounted LEDs.

A further object of the present invention is to provide for a multi-level lightpipe which is comprised of a single molded part and can collect light from multiple LEDs and redirect the light to different locations without "cross talk" or light bleed between the LEDs.

A further object of the present invention is to provide for a molded housing having an opening for receiving the multi-level lightpipe and in which the molded housing is attachable to a printed circuit board.

SUMMARY OF THE INVENTION

Surface mounted LEDs according to this invention may be placed and soldered using surface mounting equipment. The molded lightpipe of the present invention may be attached to either a circuit board or panel and is used to redirect the LED illumination to a different location. The lightpipe of the present invention further permits the use of lens material such as an acrylic or polycarbonate that is not subjected to the temperature extremes and chemicals encountered during surface mount soldering processes.

An application of the above-noted concept is to match the form of existing through-hole circuit board indicators. The present invention provides for a lightpipe equivalent to bi-level through-hole circuit board indicators. The bi-level through-hole circuit board indicators may be molded into single or multiple-width units.

The present invention additionally provides for a multi-level lightpipe component for a surface mount LED which comprises a housing having first and second LED accommodating portions and attachment means for permitting the removable attachment of the housing to a printed circuit board so as to align the first and second LED accommodating portions of the housing with first and second LEDs on the printed circuit board.

The multi-level lightpipe component further comprises at least one multi-level lightpipe positioned in an opening of the housing. The multi-level lightpipe comprises a first surface portion and a second surface portion each positioned adjacent to a corresponding one of the LED accommodating portions of the housing when the multi-level lightpipe is positioned in the opening in the housing. The first and second surface portions of the multi-level lightpipe separately receives light from a corresponding one of the first and second LEDs during use of the component.

The multi-level lightpipe also comprises a first radiating surface portion and a second radiating surface portion, as well as a first passage and a separate second passage which extend between the first surface portion and the first radiating surface portion and the second surface portion and the second radiating surface portion. The first and second passageways of the multi-level lightpipe comprise a plurality of reflecting surfaces for separately redirecting and transmitting the light from the first LED to the first radiating surface portion and the light from the second LED to the second radiating surface portion.

The present invention also relates to a multi-level lightpipe which comprises first and second surface portions, first and second radiating surface portions, and first and second light reflecting and transmitting passageways each having a predetermined radius of curvature. The first passageway of the multi-level lightpipe extends between the first surface portion and the first radiating surface portion, and the second passageway of the multi-level lightpipe extends between the second surface portion and the second radiating surface portion. The first and second passageways of the multi-level lightpipe separately directs light respectively received at each of the first and second surface portions to each of the first and second radiating surface portions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1b is a front view of the multi-level lightpipe illustrated in FIG. 1a;

FIG. 2a is a side view of the housing for receiving the multi-level lightpipe of FIG. 1a;

FIG. 2b is a front view of the housing illustrated in FIG. 2a;

FIG. 3a is a side view of the housing having the multi-level lightpipe of FIG. 1l positioned therein;

FIG. 3b is a front view of the housing and lightpipe illustrated in FIG. 3a;

FIG. 3c is an example of a printed circuit board having a recommended hole and LED layout for receiving the housing and lightpipe arrangement of FIG. 3a;

DESCRIPTION OF THE PREFERRED EMBODIMENTS

Figure 1A:
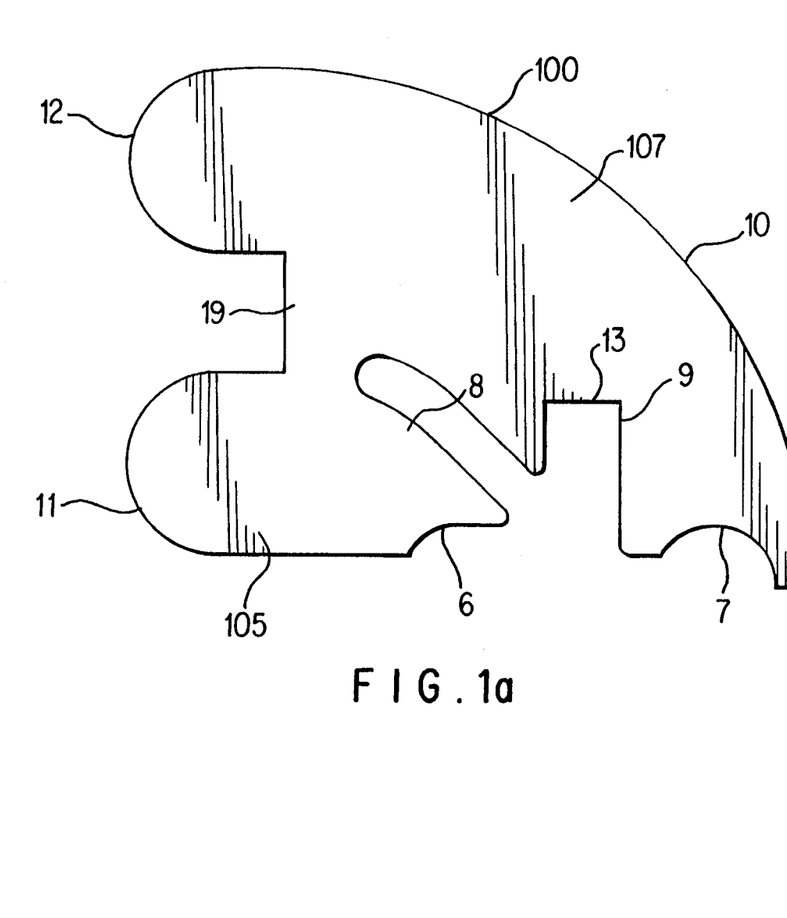
FIG. 1a illustrates a side view of the multi-level lightpipe of the present invention.
Figure 1B:
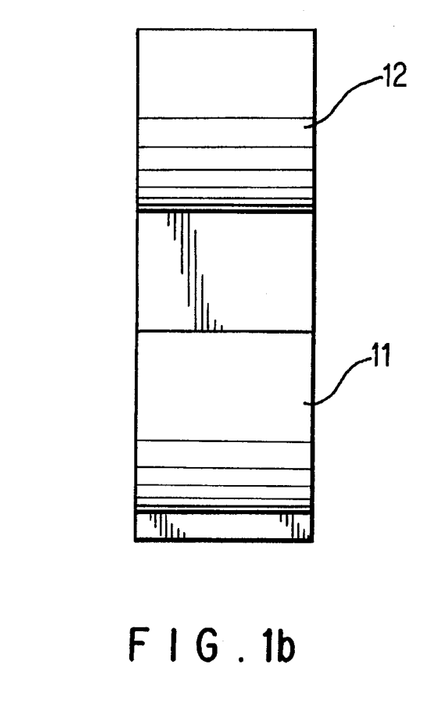
Figure 1C:
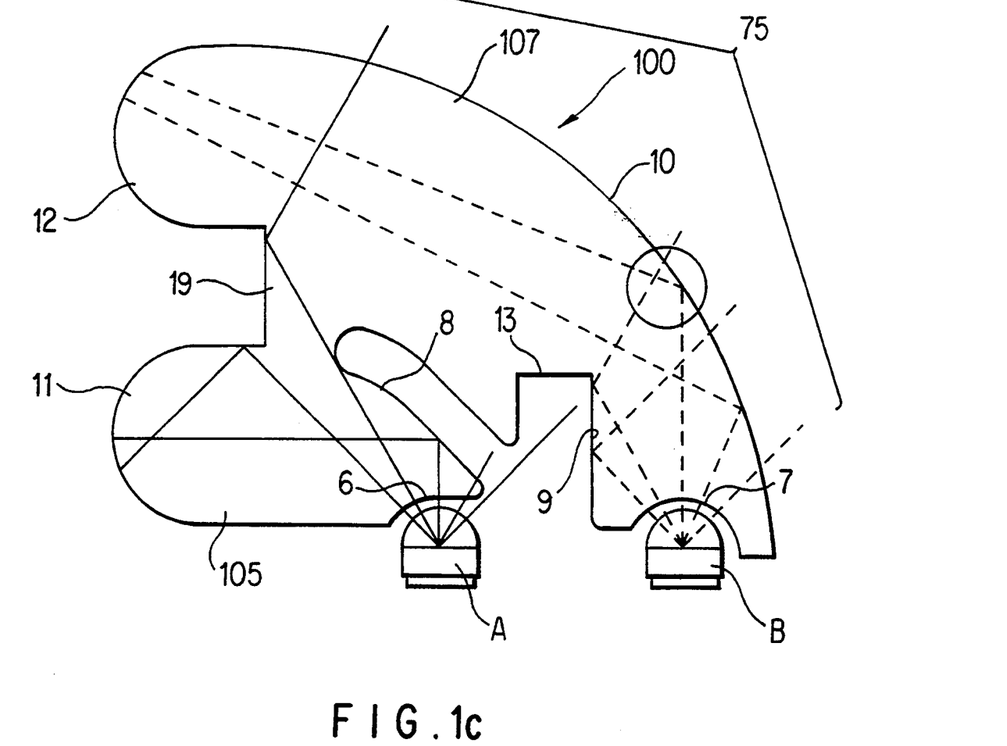
FIG. 1c illustrates the lightpipe of FIG. 1a and shows the ray tracing used to derive the design of the lightpipe.

Referring now to the drawings, wherein like reference numerals designate identical or corresponding parts throughout the several views, and more particularly to FIGS. 1a and 1b thereof, FIG. 1a illustrates a bi-level lightpipe 100. The bi-level lightpipe 100 includes first and second radiating or exit surface portions 11 and 12 as well as first and second surface portions 6 and 7. The bi-level lightpipe 100 is designed so as to define two separate passageways 105 and 107. The first passageway 105 extends from the first surface portion 6 to the first radiating portion 11. The second passageway 107 extends from the second surface portion 7 to the second radiating portion 12. Each of the first and second passageways 105, 107 preferably define a predetermined radius of curvature. The passageway 107 extends vertically above the passageway 105. FIG. 1c illustrates the ray tracing used for deriving the design of the lightpipe of FIG. 1a, which will be explained in detail later.

Figure 2A:
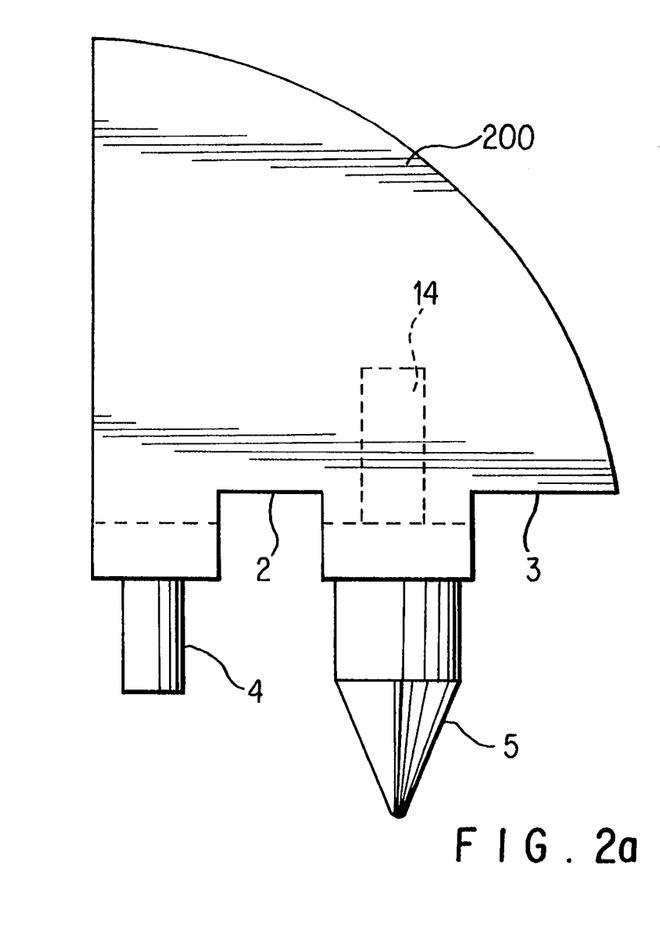
Figure 2B:
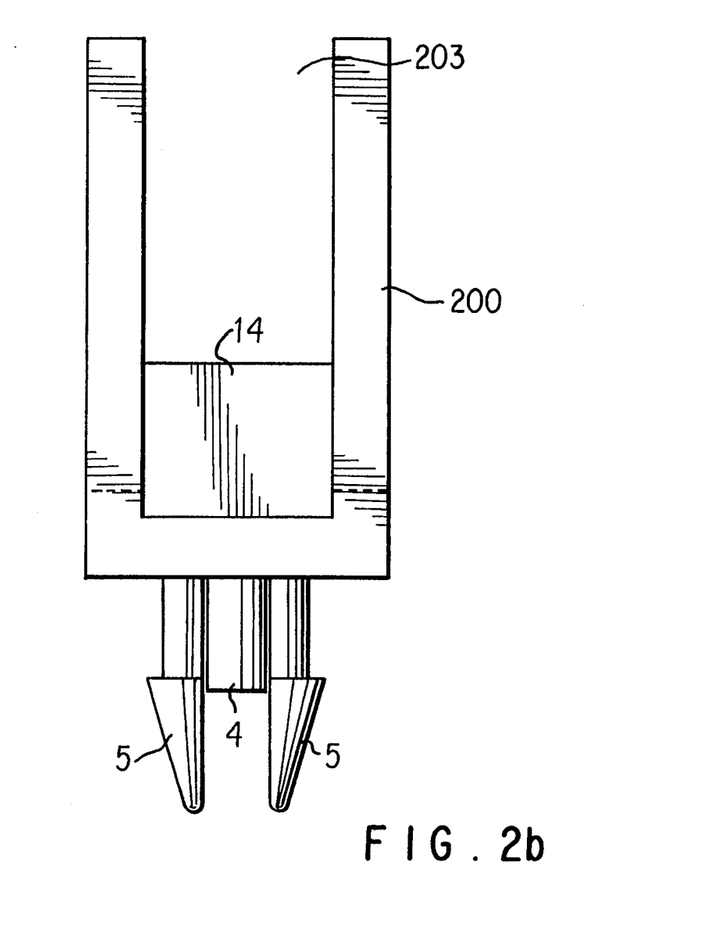
Figures 3A, 3C:
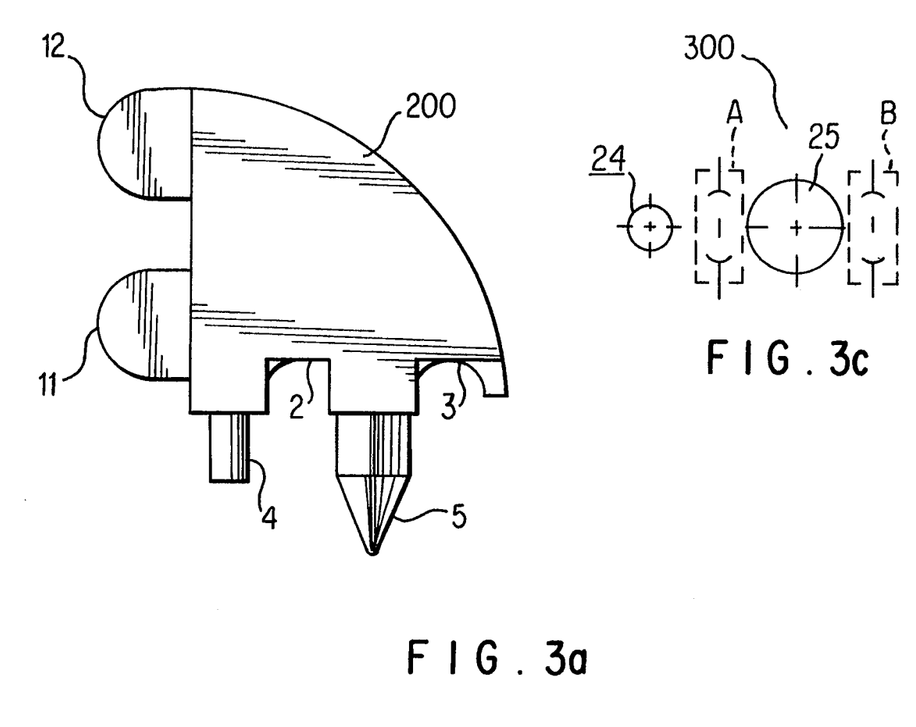

FIGS. 2a and 2b illustrate a housing 200 for receiving the bi-level lightpipe 100 of FIG. 1a. The housing 200 comprises an attachment means in the form of, for example, an alignment pin 4 and a snap pin 5. The alignment pin 4 and the snap pin 5 permit the attachment of the housing 200 to a printed circuit board 300 as generally illustrated in FIG. 3c.

A hole 24 in the printed circuit board 300 is sized, shaped, and positioned to receive the alignment pin 4, and a hole 25 in the printed circuit board 300 is sized, shaped, and positioned to receive the snap pin 5. The positions of LEDs A and B (which are soldered to the printed circuit board 300) are shown in broken lines. Types of attachment devices other than the alignment pin 4 and the snap pin 5 are, of course, possible, depending on the design characteristics of the printed circuit board 300. The housing 200 further comprises LED accommodating portions 2 and 3 which are positioned in a manner so that, when the housing 200 is attached to the printed circuit board 300 by way of the alignment pin 4 and the snap pin 5, LEDs which are located on the printed circuit board 300 will be aligned in the LED accommodating portions 2 and 3. The housing 200 as illustrated in FIG. 2a is preferably in the form of a one-piece opaque material.

The bi-level lightpipe 100 illustrated in FIG. 1a is preferably formed of a one-piece light transmissive material such as a water clear or tinted clear material. This provides for the light conducting portion of the inventive lightpipe design.

Figure 4:
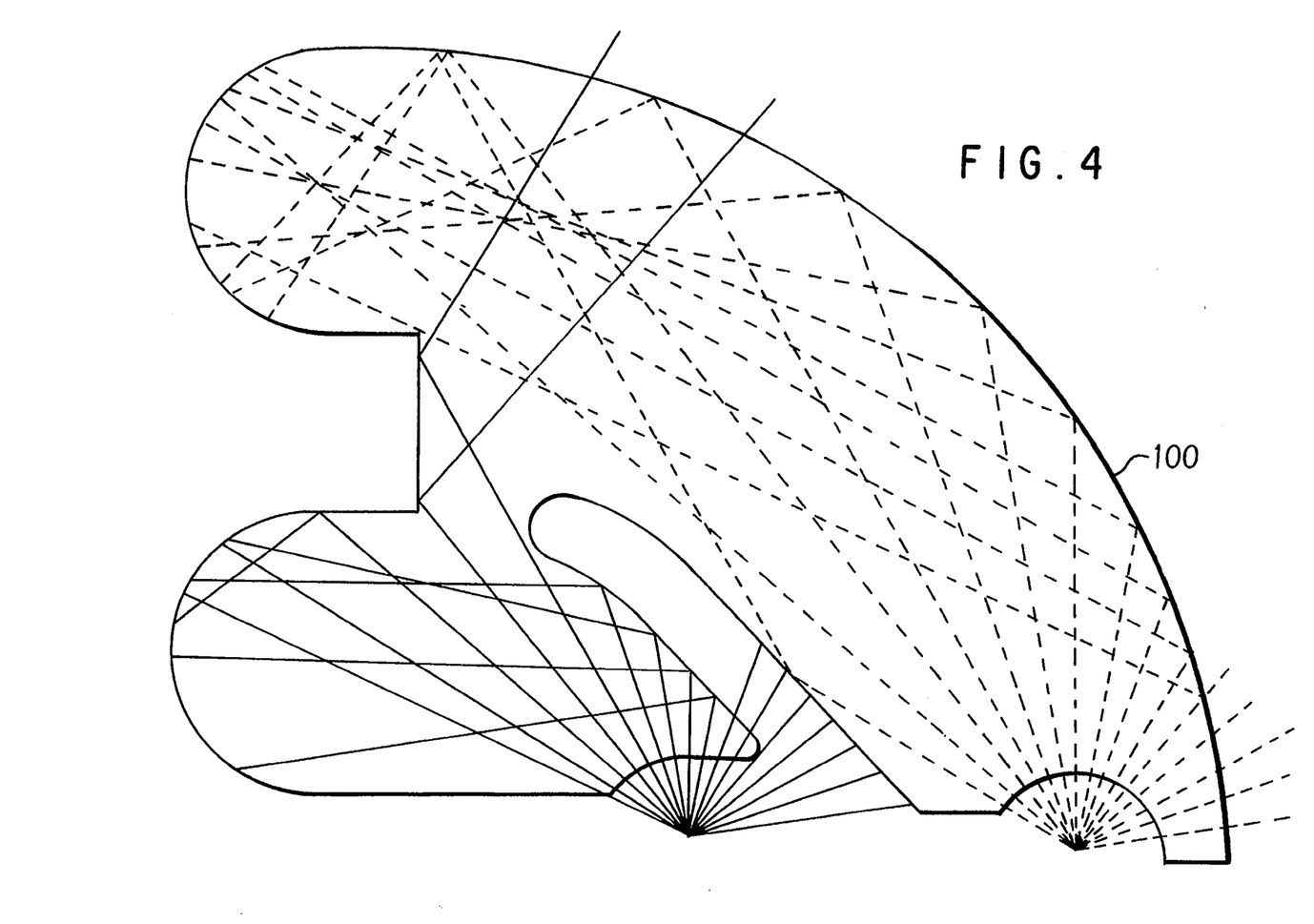
FIG. 4 is a side view of the lightpipe of FIG. 1a showing the interaction of the input rays with the internal reflecting surfaces and exit surfaces of the lightpipe.

As clearly illustrated in FIG. 4, which shows the bi-level lightpipe 100 on an enlarged scale, the surfaces of the bi-level lightpipe 100 are designed so that light rays entering the intended surfaces will remain isolated and not mix with each other to any significant extent.

Figure 3B:
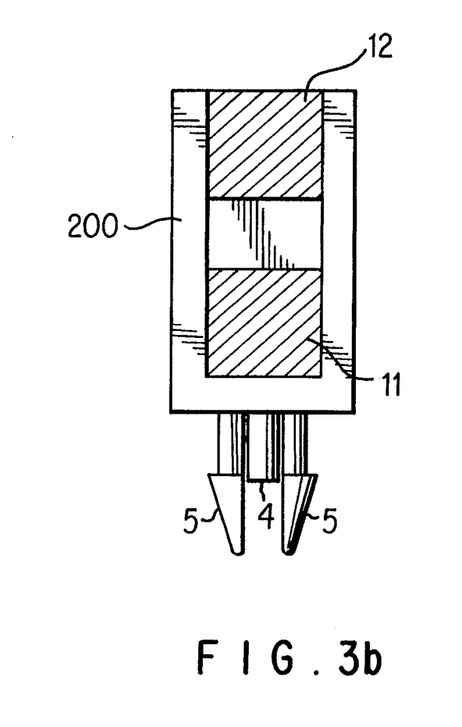

As illustrated in FIG. 2b, the housing 200 comprises an opening 203 for permitting the insertion of the bi-level lightpipe 100. FIGS. 3a and 3b illustrate the lightpipe component of the present invention in which the bi-level lightpipe 100 is inserted within the opening 203 of the housing 200. SMD LEDs are initially soldered to the printed circuit board 300 as per the recommended hole and LED layout illustrated in FIG. 3C.

As set forth above, the housing 200 with the bi-level lightpipe 100 inserted therein is secured to the circuit board 300 utilizing the alignment pin 4 and the snap pin 5. The LEDs A and B will align in the LED accommodating portions areas 2 and 3 of the housing 100.

When the bi-level lightpipe 100 is positioned inside the housing 200, the first and second surface portions 6 and 7 are positioned adjacent to the LED accommodating portions 2 and 3 of the housing 200. The LED accommodating portions 2 and 3 are respectively aligned with the LEDs A and B on the printed circuit board 300.

Light from the LED A will enter at the first surface portion 6 of the bi-level lightpipe 100 and will be internally reflected from a limiting surface 8 to the first radiating portion 11 of the bi-level lightpipe 100. Light from the LED B will enter the second surface portion 7 and will be internally reflected along a pair of speed limiting 9 and 10 to the second radiating portion 12 of the bi-level lightpipe 100. Accordingly, the first passageway 105 defines a light transmitting passage for light from the LED A, and the second passageway 107 defines a light transmitting passageway for light from the LED B.

Reference numeral 19 illustrates a mechanical connection between the upper (or second) passageway 107 and the lower (or first) passageway 105. However, the mechanical connection 19 does not permit significant mixing of light between the first and second passageways 105 and 107 when the lightpipe is illuminated.

An indented portion 13 (FIG. 1a) is aligned over a protruded portion 14 (FIG. 2a) and functions as a reflecting surface and an alignment portion for attaching the bi-level lightpipe 100 to the housing 200. Smaller lightpipes preferably use the combination of the indented portion 13 and the protruded portion 14 for added stability. In lightpipes having a larger construction, the indented portion and protruded portion are not necessary, as illustrated in the lightpipe of FIG. 4.

Referring again to FIGS. 1a and 1c, the limiting surfaces 8, 9, and 10 and other surfaces which optically and mechanically define the passageways 105 and 107 of the lightpipe are designed to optimally conduct light from the first surface portion 6 and the second surface portion 7 to the corresponding radiating surface portions 11 and 12. This design process is initiated by determining the critical angle required to maintain internal reflection through the passageways 105 and 107. Light rays are re-directed where feasible by designing the reflecting wall to prevent an angle greater than the critical angle.

Figure 1D:
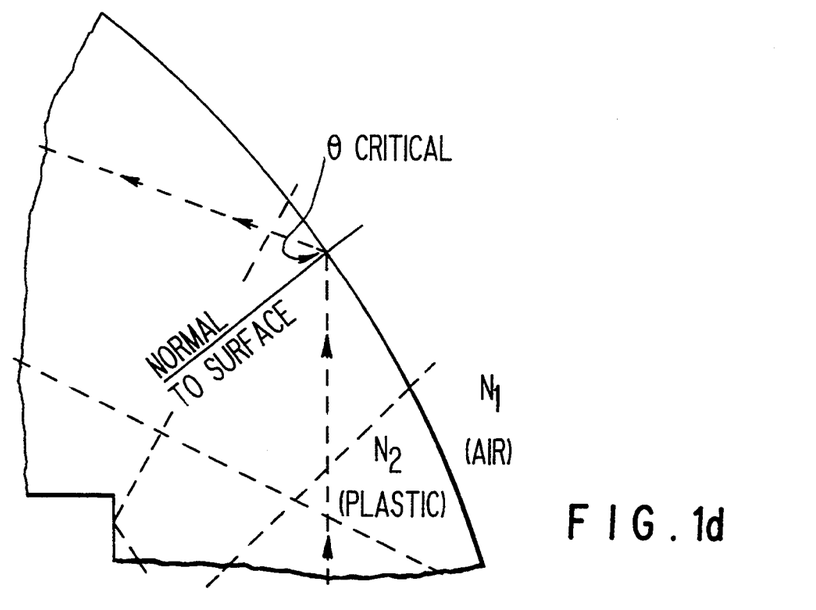
FIG. 1d is an enlarged view of the circled area in FIG. 1c.

The critical angle of a material surrounded by air is defined by $\theta = \arcsin(1/N)$ where N is the index of refraction for the material under evaluation and $\theta$ is the angle between the light ray striking a surface and a line normal to that surface (see FIG. 1d, which is an enlarged view of the circled area in FIG. 1c). For polycarbonate, $N=1.52$. Thus $\theta = 41°$.

In FIG. 1c, the first radiating portion 11 and the second radiating portion 12 are viewed surfaces. Where it is not feasible to redirect light to the desired viewing area, the opposing wall is designed to present an angle lower than the critical angle, allowing the light to "escape" in an area other than the normally viewed areas (such as the surface designated by the reference numeral 75 in FIG. 1c).

Thus, the present invention provides for an arrangement in which a single molded part can collect light from multiple LEDs and redirect light to different locations without any perceptible mixing of the lights received from the separate LEDs.

Figure 5:
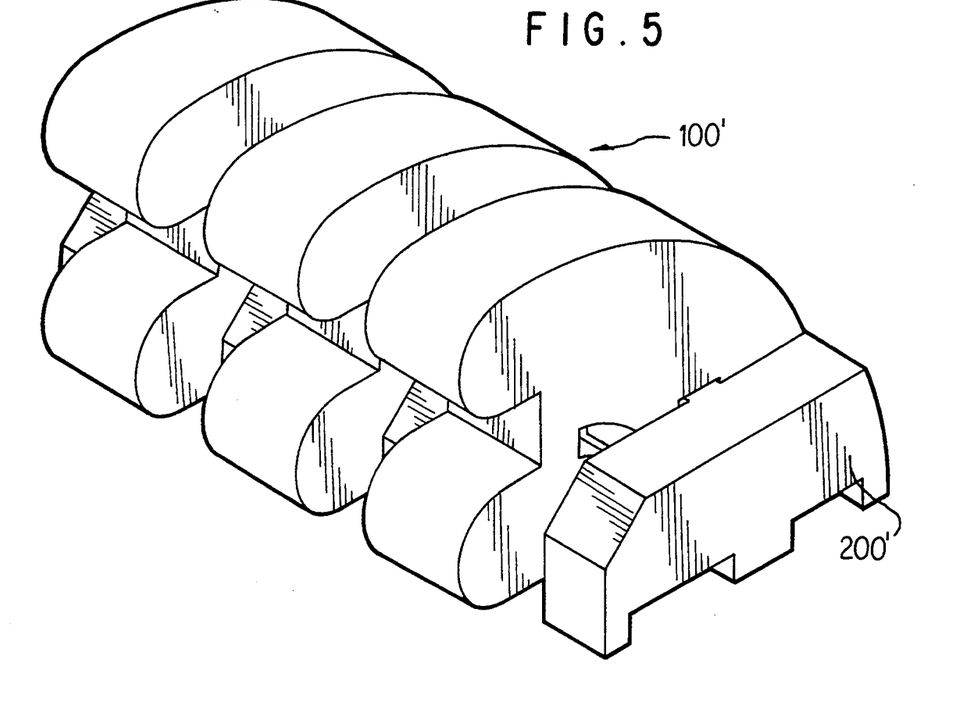
FIG. 5 is a further embodiment of the lightpipe arrangement of the present invention in which a plurality of lightpipes are positioned adjacently in a housing.

FIG. 5 illustrates a further embodiment of the present invention in which a plurality of multi-level lightpipes 100' are positioned in a side-by-side relationship within the housing 200'. The housing 200' as illustrated in FIG. 5 would be designed for a specific center-to-center spacing of the plurality of multi-level lightpipes 100.

Figure 6:
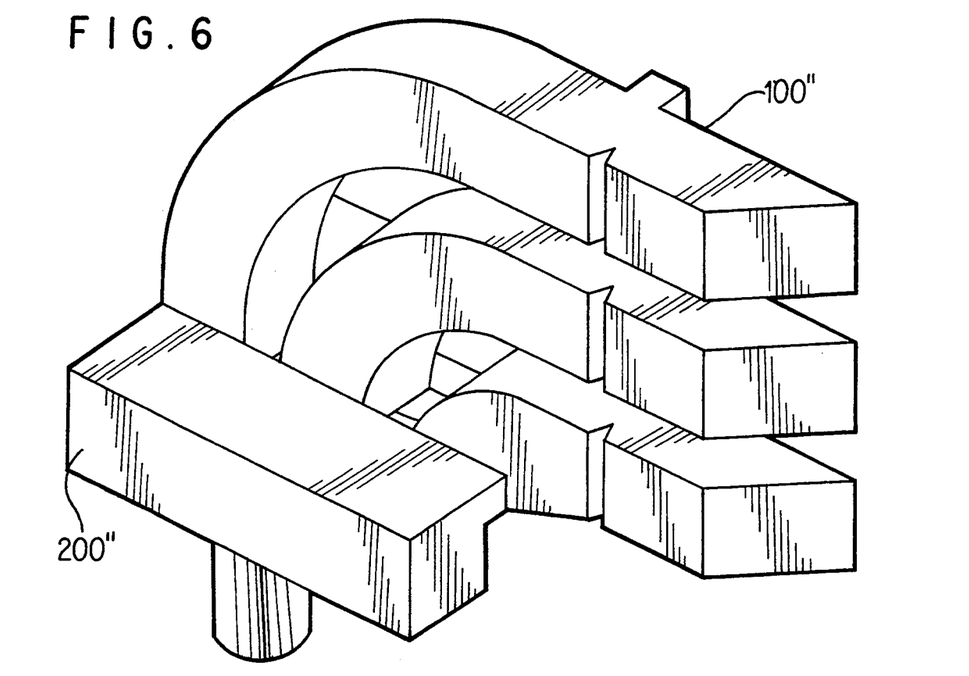
FIG. 6 is a further embodiment of the lightpipe of the present invention in which a plurality of lightpipes are positioned in a vertical plane.

FIG. 6 illustrates a further embodiment in which the multi-level lightpipes 100" are aligned in a single vertical plane within a housing 200".

Figure 7:
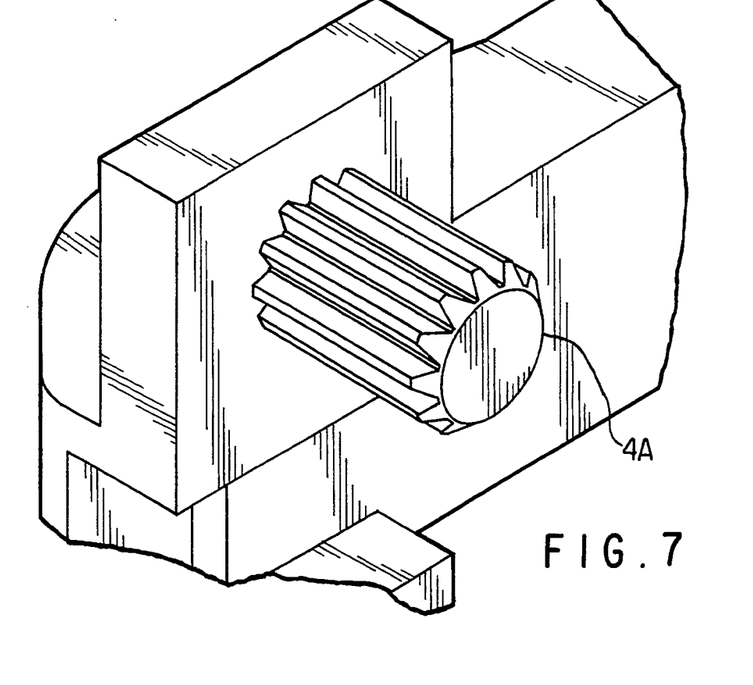
FIG. 7 illustrates an attachment mechanism in the form of a press fit pin for attaching the housing to the printed circuit board.
Figure 8:
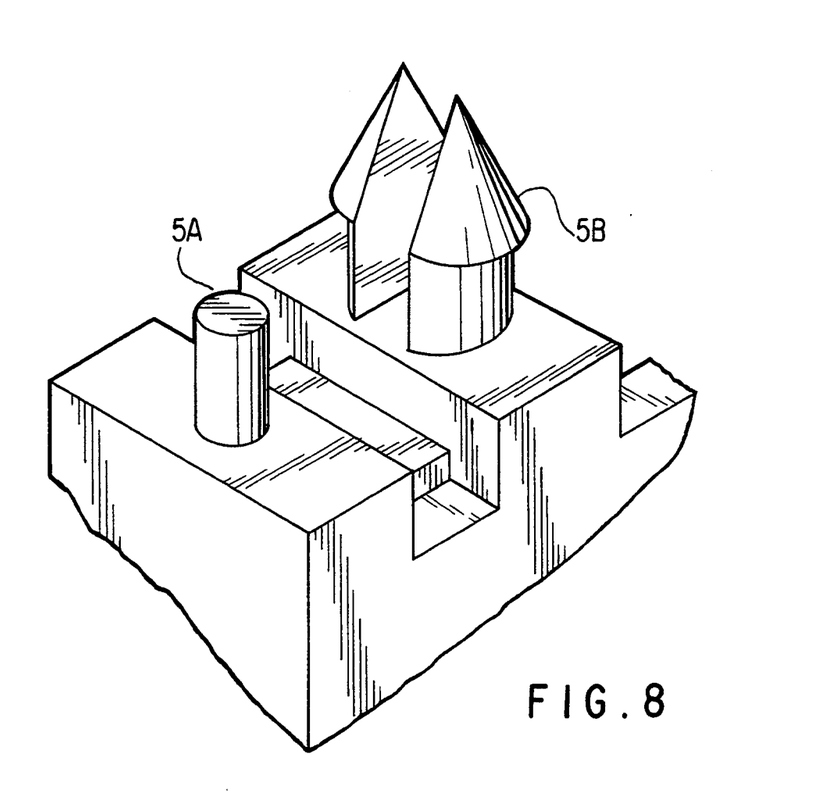
FIG. 8 illustrates a further embodiment of the attachment mechanism in the form of a snap-in post for attaching the housing to the printed circuit board.

FIGS. 7 and 8 illustrate different methods of attachment of the housing to the printed circuit board. These different methods include a press fit pin 4A as illustrated in FIG. 7 and a snap-in post arrangement (5A, 5B) as illustrated in FIG. 8. The multi-level lightpipe housing component of the present invention can also be attached to the front panel if attachment to a printed circuit board is not permissible.

It is further noted that the radiating surface portions 11 and 12 can be varied to provide an output shape of preferred configuration to the user.

Accordingly, the present invention provides for a multi-level lightpipe and housing design which allows the automatic placement and soldering of SMD LEDs and allows access for solder rework or component replacement if necessary.

The present invention also provides for an alternative to high temperature lens material by allowing lightpipe placement after soldering. These less demanding material requirements allow less costly solutions.

The present invention also provides for an optics design which is such that it may allow easy conversion from popular through-hole circuit board indicators. The area occupied by the LEDs and surrounding the LED is comparable to the through-hole parts.

Finally, the lightpipe housing configuration of the present invention permits light output in remote locations which are unreachable with conventional LED lead lengths.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A multi-level lightpipe component for a surface mount LED, said component comprising:
   (a) a housing having first and second LED accommodating portions and attachment means for permitting the removable attachment of said housing to a printed circuit board having a first and a second LED thereon so as to align said first and second LED accommodating portions of said housing with the first and second LEDs on the printed circuit board, respectively, and
   (b) a multi-level lightpipe positioned in an opening in said housing, said multi-level lightpipe comprising:
      (i) a first surface portion and a second surface portion each positioned adjacent to a corresponding one of said first and second LED accommodating portions of said housing when said multi-level lightpipe is positioned in said opening in said housing, each of said first and second surface portions separately receiving light from a corresponding one of the first and second LEDs during use of said component;
      (ii) a first radiating surface portion and a second radiating surface portion; and
      (iii) a first passageway and a separate second passageway extending between said first surface portion and said first radiating surface portion and said second surface portion and said second radiating surface portion, respectively, each of said first and second passageways comprising a plurality of reflecting surfaces for separately redirecting and transmitting the light from the first LED to said first radiating surface portion and the light from the second LED to said second radiating surface portion.

2. The multi-level lightpipe component according to claim 1, wherein said housing is comprised of a one-piece non-light transmissive material.

3. The multi-level lightpipe component according to claim 1, wherein said attachment means comprises an alignment pin and a snap pin.

4. The multi-level lightpipe component according to claim 1, wherein said multi-level lightpipe is comprised of a one-piece light transmissive material.

5. The multi-level lightpipe component according to claim 1, wherein:

(a) said housing has a first surface which, during use of said component, is parallel to the printed circuit board and (b) said first and second radiating surface portions of said multi-level lightpipe are located at different distances from said first surface.

6. The multi-level lightpipe component according to claim 5, wherein each of said first and second radiating surface portions of said multi-level lightpipe is positioned at least substantially perpendicularly to a corresponding one of said first and second LED accommodating portions.

7. The multi-level lightpipe component of claim 5 wherein said first and second radiating surfaces are located in a plane which is at least substantially perpendicular to said first surface.

8. The multi-level lightpipe component according to claim 1, wherein:

(a) said housing has a first surface which, during use of said component, is parallel to the printed circuit board and (b) said first and second passageways are in a plane that is at least substantially perpendicular to said first surface.

9. The multi-level lightpipe component according to claim 1, wherein:

(a) said housing has a first surface which, during use of said component, is parallel to the printed circuit board;

(b) said first and second LED accommodating portions are located on a first line in said first surface;

(c) said housing further comprises third and fourth LED accommodating portions sized, shaped, and positioned so as to align said third and fourth LED accommodating portions with third and fourth LEDs on the printed circuit board;

(d) said third and fourth LED accommodating portions are located on a second line in said first surface, said second line being spaced from and at least approximately parallel to said first line;

(e) said multi-level lightpipe further comprises:

(i) a third surface portion and a fourth surface portion each positioned adjacent to a corresponding one of said third and fourth LED accommodating portions of said housing when said multi-level lightpipe is positioned in said opening in said housing, each of said third and fourth surface portions separately receiving light from a corresponding one of the third and fourth LEDs during use of said component;

(ii) a third radiating surface portion and a fourth radiating surface portion; and (iii) a third passageway and a separate fourth passageway extending between said third surface portion and said third radiating surface portion and said fourth surface portion and said fourth radiating surface portion, respectively, each of said third and fourth passageways comprising a plurality of reflecting surfaces for separately redirecting and transmitting the light from the third LED to said third radiating surface portion and the light from the fourth LED to said fourth radiating surface portion.

10. The multi-level lightpipe according to claim 9, wherein:

(a) said first and second radiating surface portions of said multi-level lightpipe are located at different distances from said first surface and (b) said third and fourth radiating surface portions of said multi-level lightpipe are located at different distances from said first surface.

11. A multi-level lightpipe comprising:

(a) first and second surface portions located in a first plane;

(b) first and second radiating surface portions located in a second plane which is at least generally perpendicular to said first plane; and (c) first and second light reflecting and transmitting passageways, said first passageway extending between said first surface portion and said first radiating surface portion and said second passageway extending between said second surface portion and said second radiating surface portion, wherein:

(d) said first and second light reflecting and transmitting passageways separately direct light respectively received at each of said first and second surface portions to each of said first and second radiating surface portions and (e) said first and second light reflecting and transmitting passageways are in a third plane which is at least substantially perpendicular to both said first plane and said second plane.

* * * * *